US012314344B2

(12) United States Patent
An

(10) Patent No.: US 12,314,344 B2
(45) Date of Patent: May 27, 2025

(54) NEURAL NETWORK OF PREDICTING IMAGE DEFINITION, TRAINING METHOD AND PREDICTION METHOD

(71) Applicant: BOE Technology Group Co., Ltd., Beijing (CN)

(72) Inventor: Zhanfu An, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 417 days.

(21) Appl. No.: 17/555,167

(22) Filed: Dec. 17, 2021

(65) Prior Publication Data
US 2022/0300767 A1    Sep. 22, 2022

(30) Foreign Application Priority Data
Mar. 19, 2021   (CN) .......................... 202110298042.8

(51) Int. Cl.
*G06F 18/214*      (2023.01)
*G06F 18/22*       (2023.01)
(Continued)

(52) U.S. Cl.
CPC .......... *G06F 18/2148* (2023.01); *G06F 18/22* (2023.01); *G06N 3/08* (2013.01);
(Continued)

(58) Field of Classification Search
None
See application file for complete search history.

(56) References Cited

U.S. PATENT DOCUMENTS

2022/0237917 A1    7/2022   Wu et al.
2023/0030267 A1*   2/2023   Chen .................... G06V 40/168

FOREIGN PATENT DOCUMENTS

CA       3174691 A1      9/2021
CN     107977639 A       5/2018
(Continued)

OTHER PUBLICATIONS

Lijun, Zhang, et al. "Multi-Branch Face Quality Assessment for Face Recognition." 2019 IEEE 19th International Conference on Communication Technology (ICCT), 2019, pp. 1659-1664. IEEE Xplore, https://doi.org/10.1109/ICCT46805.2019.8947255. (Year: 2019).*

(Continued)

*Primary Examiner* — Matthew C Bella
*Assistant Examiner* — Johnny B Duong
(74) *Attorney, Agent, or Firm* — IPro, PLLC

(57) ABSTRACT

The present application disclose a neural network of predicting image definition, a training method and a prediction method. The training method includes: obtaining an image set and definition labels of some images in the image set, thereby obtaining image samples with the definition labels and to-be-expanded images except for the image samples; and extracting definition features of at least some images in the image set, obtaining definition labels of at least some images in the to-be-expanded images according to the extracted definition features, correcting the definition labels of the at least some images in the to-be-expanded images to expand the image samples, and using the image samples to train the neural network of predicting image definition, thereby obtaining a trained neural network.

19 Claims, 6 Drawing Sheets

(51) Int. Cl.
*G06N 3/08* (2023.01)
*G06V 10/42* (2022.01)
*G06V 10/82* (2022.01)
*G06V 20/70* (2022.01)

(52) U.S. Cl.
CPC .............. *G06V 10/42* (2022.01); *G06V 10/82* (2022.01); *G06V 20/70* (2022.01)

(56) References Cited

FOREIGN PATENT DOCUMENTS

| CN | 108009589 A | 5/2018 | | |
| CN | 110309789 A | 10/2019 | | |
| CN | 110503606 A | 11/2019 | | |
| CN | 111368758 A | 7/2020 | | |
| CN | 111414842 A | 7/2020 | | |
| CN | 111476060 A | 7/2020 | | |
| CN | 111814759 B | * | 12/2020 | ......... G06K 9/00288 |
| CN | 112215822 A | * | 1/2021 | ......... G06K 9/00288 |

OTHER PUBLICATIONS

Park, Byung-Hwa, et al. "Face Alignment Using a Deep Neural Network with Local Feature Learning and Recurrent Regression." Expert Systems with Applications, vol. 89, Dec. 2017, pp. 66-80. DOI.org (Crossref), https://doi.org/10.1016/j.eswa.2017.07.018. (Year: 2017).*

Rahimian, Elahe, et al. XceptionTime: A Novel Deep Architecture Based on Depthwise Separable Convolutions for Hand Gesture Classification. arXiv:1911.03803, arXiv, Nov. 9, 2019. arXiv.org, https://doi.org/10.48550/arXiv.1911.03803. (Year: 2019).*

Zhao, Xuan, Yali Li, and Shengjin Wang. "Face quality assessment via semi-supervised learning." Proceedings of the 2019 8th international conference on computing and pattern recognition. 2019. (Year: 2019).*

* cited by examiner

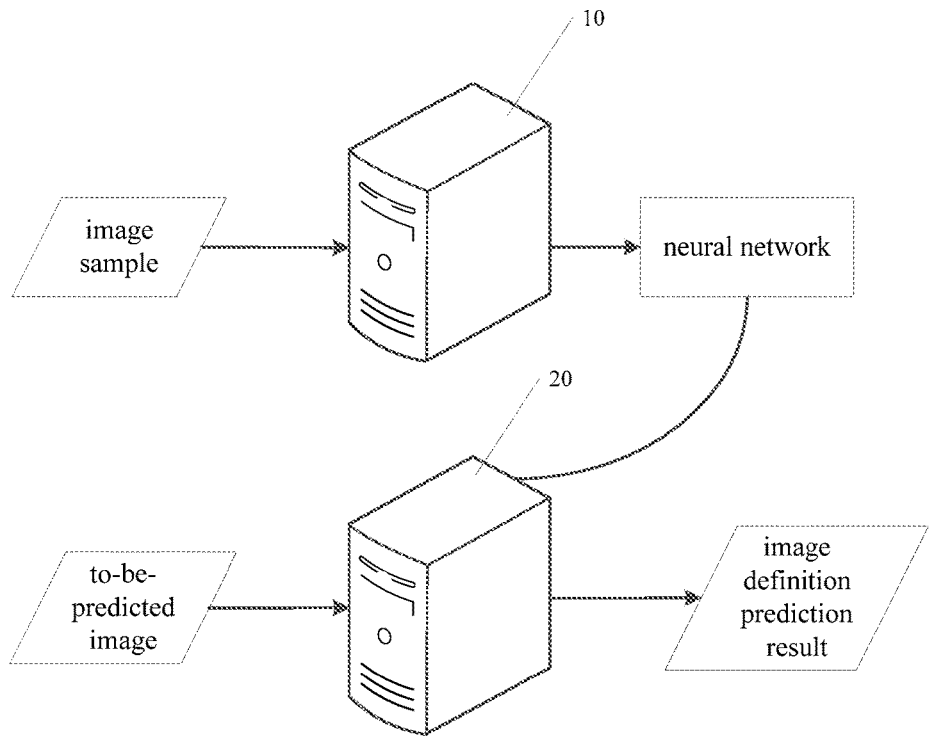

FIG. 1 obtaining a face image set and definition labels of some face images in the face image set, thereby obtaining image samples with the definition labels and to-be-expanded images except for the image samples — S110 extracting definition features of at least some face images in the face image set, obtaining definition labels of at least some face images in the to-be-expanded images according to the extracted definition features, correcting the definition labels of the at least some face images in the to-be-expanded images to expand the image samples, and using the image samples to train a neural network of predicting face image definition, thereby obtaining a trained neural network — S120

FIG. 2

NEURAL NETWORK OF PREDICTING IMAGE DEFINITION, TRAINING METHOD AND PREDICTION METHOD

CROSS-REFERENCE TO RELATED APPLICATIONS

The present application claims a priority to the Chinese patent application No. 202110298042.8 filed in China on Mar. 19, 2021, a disclosure of which is incorporated herein by reference in its entirety.

TECHNICAL FIELD

The present application relates to the field of deep learning technologies, and in particular to a neural network of predicting image definition, a training method, a prediction method, a computer device and a medium.

BACKGROUND

At present, image definition prediction is required in many scenes to determine whether images meet definition requirements and whether they can be used for subsequent applications. For example, when collecting a facial image through a monitoring device, it is necessary to predict definition of the facial image to determine whether the facial image can be used for face recognition; when remotely receiving an identification photo image, it is necessary to predict definition of the identification photo image to determine whether the identification photo image can be used for user authentication; when remotely receiving a vehicle accident image, it is necessary to predict definition of the vehicle accident image to determine whether the vehicle accident image can be used for damage assessment, and so on.

Among solutions of image definition prediction in the related art, one commonly used solution is to predict definition of an input to-be-predicted image through a trained neural network. Such solution needs to use a large number of image samples with definition labels to train the neural network in the early stage. At present, a method of obtaining image samples is to manually label all images in a selected image set, that is, definition labels of all the images are obtained by manual labeling, thereby obtaining the image samples. In the process of implementing the present application, the inventor found that the above method has at least the following problems: the number of image samples used to train the neural network may reach thousands or even tens of thousands, and if all these image samples are manually labeled, there will be problems such as high labor costs and low work efficiency; further, the labeling process completely relies on subjective judgments of users, and accuracy of labeling is difficult to guarantee, which will affect training costs, training efficiency and prediction accuracy of the trained neural network.

SUMMARY

In a first aspect, one embodiment of the present application provides a method for training a neural network of predicting image definition, including: obtaining an image set and definition labels of some images in the image set, thereby obtaining image samples with the definition labels and to-be-expanded images except for the image samples; and extracting definition features of at least some images in the image set, obtaining definition labels of at least some images in the to-be-expanded images according to the extracted definition features, correcting the definition labels of the at least some images in the to-be-expanded images to expand the image samples, and using the image samples to train the neural network of predicting image definition, thereby obtaining a trained neural network.

Optionally, the extracting definition features of at least some images in the image set, obtaining definition labels of at least some images in the to-be-expanded images according to the extracted definition features, correcting the definition labels of the at least some images in the to-be-expanded images to expand the image samples, and using the image samples to train the neural network of predicting image definition, thereby obtaining a trained neural network, includes: using the image samples to train the neural network; using the trained neural network to extract definition features of the at least some images in the to-be-expanded images and perform definition prediction on the at least some images in the to-be-expanded images, thereby obtaining the definition labels of the at least some images in the to-be-expanded images; and determining whether a proportion of definition labels that need to be corrected, in the definition labels of the at least some images in the to-be-expanded images, is greater than a preset threshold; if the proportion is greater than the preset threshold, performing correction and expanding the image samples with the corrected at least some images in the to-be-expanded images, and returning to use the image samples to train the neural network; if the proportion is less than the preset threshold, ending the training, thereby obtaining the trained neural network.

Optionally, each time the number of images which use the trained neural network for definition prediction is gradually increased.

Optionally, the image set includes multiple groups of images, and images in each group include a same target; the obtaining definition labels of some images in the image set, includes: obtaining a definition label of one image with the highest definition in each group of images, thereby obtaining image samples with the definition labels.

Optionally, the extracting definition features of at least some images in the image set, obtaining definition labels of at least some images in the to-be-expanded images according to the extracted definition features, correcting the definition labels of the at least some images in the to-be-expanded images to expand the image samples, and using the image samples to train the neural network of predicting image definition, thereby obtaining a trained neural network, includes: extracting definition features of each image in the image set; calculating similarity between the definition features of each image sample and the definition features of other images in the group to which the each image sample belongs; obtaining definition labels of other images, which are used as to-be-expanded images, in each group, according to the similarity, and correcting the definition labels of the to-be-expanded images to expand the image samples; using the expanded image samples to train the neural network of predicting image definition, thereby obtaining the trained neural network.

Optionally, before extracting definition features of each image in the image set, the method further includes: detecting target feature points of each image in the image set, and performing target alignment on each image in each group of images according to the target feature points.

Optionally, the extracting definition features of at least some images in the image set, obtaining definition labels of at least some images in the to-be-expanded images according to the extracted definition features, correcting the definition labels of the at least some images in the to-be-expanded images to expand the image samples, and using the image samples to train the neural network of predicting image definition, thereby obtaining a trained neural network, includes: extracting definition features of each image in the first image set; calculating similarity between the definition features of each image sample and the definition features of other images in the group to which the each image sample belongs; obtaining definition labels of other images, which are used as to-be-expanded images, in each group, according to the similarity, and correcting the obtained definition labels of some images in the to-be-expanded images to expand the image samples; using the expanded image samples to train the neural network; using the trained neural network to extract definition features of some images in the to-be-expanded images and perform definition prediction on the some images in the to-be-expanded images, thereby obtaining definition labels of the some images in the to-be-expanded images; determining whether a proportion of definition labels that need to be corrected, in the definition labels of the some images in the to-be-expanded images, is greater than a preset threshold, according to whether the definition labels of the some images in the to-be-expanded images, which are obtained based on definition prediction, are consistent with the definition labels of the some images in the to-be-expanded images, which are obtained based on similarity calculation; if the proportion is greater than the preset threshold, performing correction and expanding the image samples with the corrected some images in the to-be-expanded images, and using the expanded image samples to train the neural network; if the proportion is less than the preset threshold, ending the training, thereby obtaining the trained neural network.

Optionally, the correcting the definition labels of the at least some images in the to-be-expanded images, includes: displaying a correction interface, wherein the correction interface includes a correction control, at least some images in the to-be-expanded images and corresponding definition labels; and in response to operation of the correction control, correcting the definition label of the corresponding image in the correction interface.

Optionally, the image set is a face image set.

In a second aspect, one embodiment of the present application provides a neural network of predicting image definition, including a neural network obtained through training in the first aspect.

Optionally, the neural network is a lightweight neural network.

Optionally, the lightweight neural network includes a convolution module, a first depthwise separable convolution module, a second depthwise separable convolution module and a third depthwise separable convolution module, which are sequentially connected; the lightweight neural network further includes a first adaptive average pooling layer connected to the first depthwise separable convolution module, a second adaptive average pooling layer connected to the second depthwise separable convolution module, a third adaptive average pooling layer connected to the third depthwise separable convolution module, a concat module which is respectively connected to the first adaptive average pooling layer, the second adaptive average pooling layer and the third adaptive average pooling layer, and a classifier connected to the concat module.

In a third aspect, one embodiment of the present application provides an image definition prediction method, including: inputting a to-be-predicted image into a neural network, thereby obtaining an image definition prediction value; wherein the neural network includes a convolution module, a first depthwise separable convolution module, a second depthwise separable convolution module and a third depthwise separable convolution module, which are sequentially connected; the neural network further includes a first adaptive average pooling layer connected to the first depthwise separable convolution module, a second adaptive average pooling layer connected to the second depthwise separable convolution module, a third adaptive average pooling layer connected to the third depthwise separable convolution module, a concat module which is respectively connected to the first adaptive average pooling layer, the second adaptive average pooling layer and the third adaptive average pooling layer, and a classifier connected to the concat module.

In a fourth aspect, one embodiment of the present application provides a computer device, including: a memory, a processor, and a computer program stored in the memory and executable on the processor, wherein the processor executes the program to implement the method in the first aspect or the method in the third aspect.

In a fifth aspect, one embodiment of the present application provides a computer-readable storage medium, including a computer program stored thereon; wherein the computer program is executed by a processor to implement the method in the first aspect or the method in the third aspect.

Additional aspects and advantages of the present application will be given in the following description, which will become apparent from the following description, or be understood through practice of the present application.

BRIEF DESCRIPTION OF THE DRAWINGS

The foregoing and/or additional aspects and advantages of the present application will become apparent and easy to understand from the following description of the embodiments in conjunction with the accompanying drawings, in which:

FIG. 1 shows an exemplary system architecture diagram in which an embodiment of the present application can be applied;

FIG. 2 is a flowchart of a method for training a neural network of predicting face image definition according to an embodiment of the present application;

DETAILED DESCRIPTION

Figure 3:
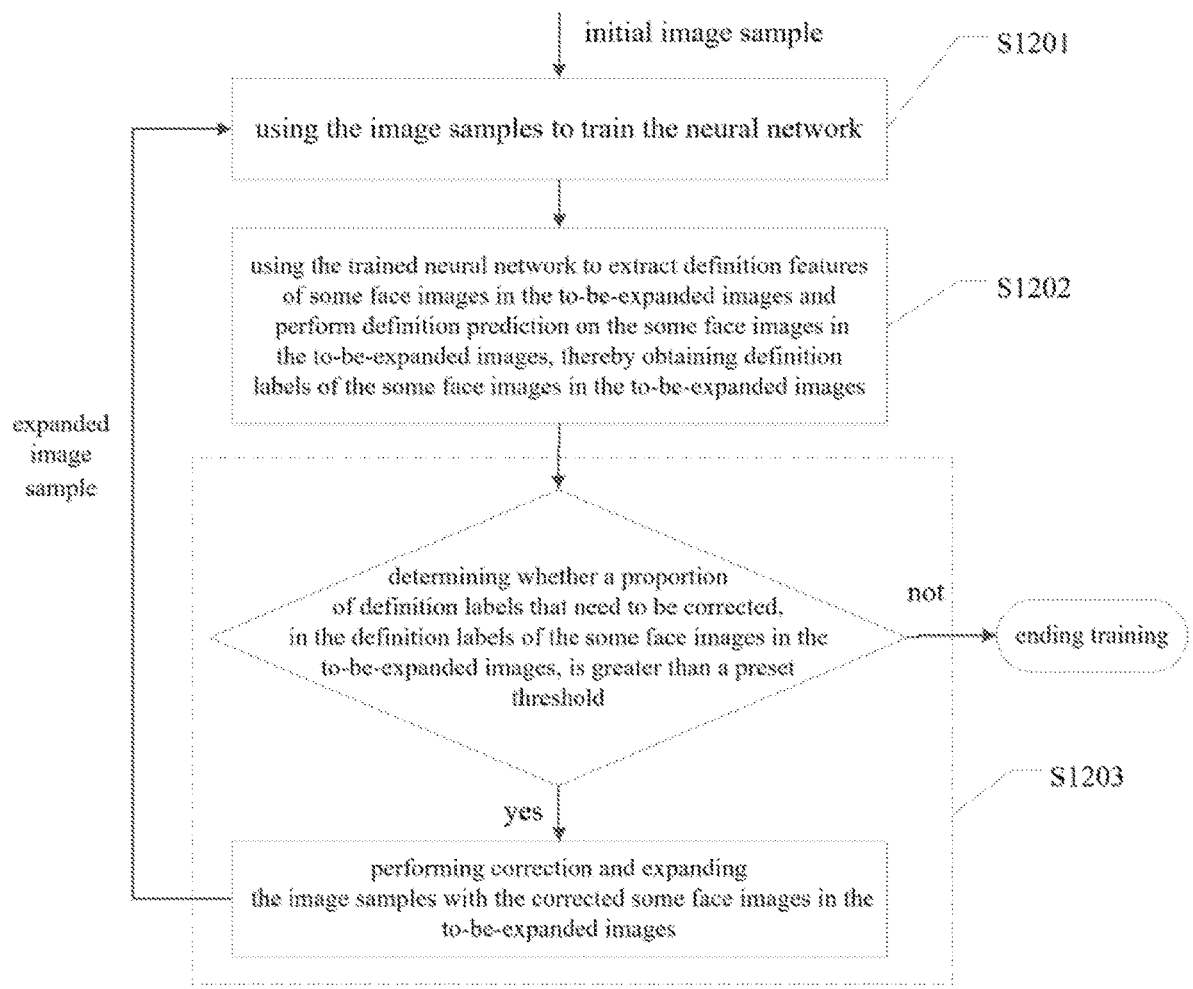
FIG. 3 is a flowchart of sub-steps of a step S120 in FIG. 2 according to an embodiment of the present application.

Reference will now be made in detail to the exemplary embodiments of the present application, examples of which are illustrated in the accompanying drawings, wherein the various details of the embodiments of the present application are included to facilitate understanding and are to be considered as exemplary only. Accordingly, a person skilled in the art should appreciate that various changes and modifications can be made to the embodiments described herein without departing from the scope and spirit of the present application. Also, descriptions of well-known functions and structures are omitted from the following description for clarity and conciseness.

At present, image definition prediction is required in many scenes to determine whether images meet definition requirements and whether they can be used for subsequent applications. For example, when collecting a face image through a monitoring device, it is necessary to predict definition of the face image to determine whether the face image can be used for face recognition; when remotely receiving an identification photo image, it is necessary to predict definition of the identification photo image to determine whether the identification photo image can be used for user authentication; when remotely receiving a vehicle accident image, it is necessary to predict definition of the vehicle accident image to determine whether the vehicle accident image can be used for damage assessment, and so on.

Among solutions of image definition prediction in the related art, one commonly used solution is to predict definition of an input to-be-predicted image through a trained neural network. Such solution needs to use a large number of image samples with definition labels to train the neural network in the early stage. At present, a method of obtaining image samples is to manually label all images in a selected image set, that is, definition labels of all the images are obtained by manual labeling, thereby obtaining the image samples. In the process of implementing the present application, the inventor found that the above method has at least the following problems: the number of image samples used to train the neural network may reach thousands or even tens of thousands, and if all these image samples are manually labeled, there will be problems such as high labor costs and low work efficiency; further, the labeling process completely relies on subjective judgments of users, and accuracy of labeling is difficult to guarantee, which will affect training costs, training efficiency and prediction accuracy of the trained neural network.

In view of this, one embodiment of the present application provides a method for training a neural network of predicting image definition. The method includes:

obtaining an image set and definition labels of some images in the image set, thereby obtaining image samples with the definition labels and to-be-expanded images except for the image samples;

extracting definition features of at least some images in the image set, obtaining definition labels of at least some images in the to-be-expanded images according to the extracted definition features, correcting the definition labels of the at least some images in the to-be-expanded images to expand the image samples, and using the image samples to train a neural network of predicting image definition, thereby obtaining a trained neural network.

Based on the method for training the neural network of predicting image definition, only a small number of images in the image set are manually labelled at the beginning, then definition features of images in the image set can be automatically extracted, and then definition labels of remaining images in the image set are obtained according to the extracted definition features, thereby expanding the image samples and completing the training of the neural network. In this way, the method for training the neural network of predicting image definition provided in this embodiment realizes a semi-automatic training process, which can realize that there is no need to manually label a large number of images, and a required number of image samples with high label accuracy can be obtained by manually labelling only a small number of images and correcting the expanded image samples, so that the image samples can be obtained accurately and efficiently to complete the training, thereby effectively reducing training costs, improving training efficiency, and improving prediction accuracy of the trained neural network.

The neural network of predicting image definition provided in this embodiment can be used to predict definition of different types of images in multiple scenes. For example, when collecting a face image through a monitoring device, the neural network of predicting image definition provided in this embodiment can be used to predict definition of the face image to determine whether the face image can be used for face recognition; when remotely receiving an identification photo image, the neural network of predicting image definition provided in this embodiment can be used to predict definition of the identification photo image to determine whether the identification photo image can be used for user authentication; when remotely receiving a vehicle accident image, the neural network of predicting image definition provided in this embodiment can be used to predict definition of the vehicle accident image to determine whether the vehicle accident image can be used for damage assessment, and so on.

The method for training a neural network of predicting image definition provided in this embodiment may be implemented by a computer device with data processing capabilities. Specifically, the computer device may be a computer with data processing capabilities, such as a personal computer (PC), a minicomputer or a mainframe, or may be a server or server cluster with data processing capabilities, which is not limited in this embodiment.

In order to facilitate understanding of the technical solution of this embodiment, an actual scenario of the foregoing method provided in this embodiment will be described hereinafter with reference to FIG. 1. Referring to FIG. 1, the scenario includes a training server 10 and a prediction server 20. In this embodiment, the training server 10 first uses image samples to train a neural network of predicting image definition to obtain a trained neural network. Subsequently, the prediction server 20 may use the trained neural network obtained by the training server 10 to perform image definition prediction. For example, a to-be-predicted image is input into the prediction server 20, thereby obtaining an image definition prediction result.

It should be noted that, in actual applications, the training server 10 and the prediction server 20 shown in FIG. 1 may be two independent servers, or a server integrated with a model training function and an image definition prediction function. When the training server 10 and the prediction server 20 shown in FIG. 1 are two independent servers, the two servers may communicate each other through a network, and the network may include various connection types, such as wired, wireless communication links, or fiber optic cables.

Hereinafter, from the perspective of a processing device with data processing capabilities, the method for training the neural network of predicting image definition provided in this embodiment will be described in details by taking face image definition prediction as an example. Then, the method for training the neural network of predicting image definition provided in this embodiment may be referred as a method for training a neural network of predicting face image definition.

As shown in FIG. 2, one embodiment of the present application provides a method for training a neural network of predicting face image definition, including the following steps S110 and S120.

Step S110: obtaining a face image set and definition labels of some face images in the face image set, thereby obtaining image samples with the definition labels and to-be-expanded images except for the image samples.

In one specific example, the definition label may be a definition level. For example, a total of five definition levels, such as definition levels 1-5, may be defined. The definition level 5 means very clear, and its standard is that face contour and facial features are very clear and a face recognition effect is very good when applied to face recognition; the definition level 4 means clear, and its standard is that face contour and facial features are clear and a face recognition effect is good when applied to face recognition; the definition level 3 means middle level, and its standard is that face contour is clear and facial features are not clear, and it is barely applied to face recognition; the definition level 2 means relatively fuzzy, and its standard is that face contour is not clear and facial features are basically invisible, and it basically cannot be applicable to face recognition; the definition level 1 means very fuzzy, and its standard is that face contour and facial features are invisible, and it certainly cannot be applicable to face recognition.

In one specific example, for example, a to-be-trained neural network is a lightweight neural network, and about 2000 image samples are used for training. Then, according to the solution of obtaining definition labels of all face images by manual labeling in the related art, it is necessary to manually label the definition labels of about 2000 face images. While in the step S110 of this embodiment, for a face image set including 2000 face images of different definitions, it is only necessary to manually label definition labels of randomly selected, for example, 200 face images, that is, obtaining only 200 image samples with definition labels are sufficient, and the remaining 1800 unlabeled face images are used as to-be-expanded images.

Following the foregoing example, the computer device that implements the method for training a neural network provided in this embodiment may provide a labelling interface. The labelling interface displays a randomly selected face image and a labelling control (for example, the labelling control may include five selection controls representing definition levels 1-5 below the face image). In response to operations of the labelling control by an annotator, a definition label of the face image is obtained. The face image displayed on the labelling interface cannot be too small, otherwise the annotator will not be able to see clearly. For example, one labelling interface displays three face images and a page turning control. In response to operations of the page turning tool by the annotator, follow-up randomly selected face images are displayed. For example, in order to ensure accuracy of the definition labels of the face images obtained in the step S110, a multi-person labeling method may be used. For example, five annotators label the selected 200 face images, respectively; for each of the selected 200 face images, after removing the labelled highest definition level and the lowest definition level, an average level of three remaining definition levels is used as the definition label.

Step S120: extracting definition features of at least some face images in the face image set, obtaining definition labels of at least some face images in the to-be-expanded images according to the extracted definition features, correcting the definition labels of the at least some face images in the to-be-expanded images to expand the image samples, and using the image samples to train a neural network of predicting face image definition, thereby obtaining a trained neural network.

In one possible implementation, the correcting the definition labels of the at least some face images in the to-be-expanded images in the step S120 includes:

displaying a correction interface, where the correction interface includes a correction control, at least some face images in the to-be-expanded images and corresponding definition labels; and in response to operation of the correction control, correcting the definition label of the corresponding face image in the correction interface.

Based on the correction operation interaction mode provided in this implementation, a user can conveniently view face images in the to-be-expanded images and corresponding definition labels, and can conveniently and efficiently realize correction of the definition labels.

Following the foregoing example, the computer device that implements the method for training a neural network provided in this embodiment may provide a correction interface. The correction interface displays at least some face images in the to-be-expanded images and corresponding definition labels obtained according to the extracted definition feature (i.e., face images with to-be-corrected definition labels and the to-be-corrected definition labels), and a correction control (for example, the correction control may include five selection controls representing definition levels 1-5 below the face image). In response to operations of the correction control by the annotator, a corrected definition label of the corresponding face image is obtained. The face image displayed on the correction interface cannot be too small, otherwise the annotator will not be able to see clearly. For example, one correction interface displays three face images and a page turning control. In response to operations of the page turning tool by the annotator, follow-up face images with to-be-corrected definition labels are displayed.

In one possible implementation, as shown in FIG. 3, the step S120 includes the following sub-steps S1201 to S1203.

Step S1201: using the image samples to train the neural network.

Following the previous example, for example, the to-be-trained neural network is a lightweight neural network, and about 2000 image samples are used for training. The face image set includes 2000 face images. In the step S110, the definition labels of 200 face images in the face image set are obtained, thereby obtaining 200 image samples. The remaining unlabeled 1800 face images are used as to-be-expanded images. Then, when the step S1201 is executed for the first time, that is, when the lightweight neural network is trained for the first time, the lightweight neural network is trained with the 200 image samples with definition labels obtained in the step S110.

Step S1202: using the trained neural network to extract definition features of some face images in the to-be-expanded images and perform definition prediction on the some face images in the to-be-expanded images, thereby obtaining definition labels of the some face images in the to-be-expanded images.

Following the previous example, when the step S1202 is executed for the first time, 200 face images are randomly selected from the unlabeled 1800 face images in the face image set as the to-be-expanded images, and are input into the lightweight neural network obtained through the first training, thereby using the lightweight neural network obtained through the first training to perform definition prediction on the 200 to-be-expanded images and then obtaining definition labels (i.e., definition label prediction values) of the 200 to-be-expanded images. That is, the lightweight neural network obtained through the first training is used to perform definition prediction on some face images (200 face images) in the to-be-expanded images (1800 face images) to obtain the definition labels of the 200 to-be-expanded images.

Step S1203: determining whether a proportion of definition labels that need to be corrected, in the definition labels of the some face images in the to-be-expanded images, is greater than a preset threshold; if the proportion is greater than the preset threshold, performing correction and expanding the image samples with the corrected some face images in the to-be-expanded images, and proceeding to the step S1201; if the proportion is less than the preset threshold, ending the training, thereby obtaining the trained neural network.

Following the previous example, when the step S1203 is executed for the first time, it is determined whether a proportion of definition labels that need to be corrected, in the definition labels of the 200 to-be-expanded images obtained when the step S1202 is executed for the first time, is greater than a preset threshold which is, for example, 10%. If the proportion is greater than 10%, the definition labels that need to be corrected, are corrected, and then the image samples are expanded with the 200 to-be-expanded images with corrected definition labels. That is, the 200 face images with the corrected definition labels and the 200 image samples obtained in the step S110 are together as image samples, and then the image samples are expanded to 400. After the expansion, it is returned to the step S1201 (which is after performing the step S1201 for the first time, that is, performing the step S1201 for second time, i.e., using the 400 image samples to train the neural network for the second time; each subsequent time the step S1201 is performed for training, the number of the image samples will increase compared to the previous training). If the proportion is less than or equal to 10%, the training ends, thereby obtaining the trained neural network.

The flow of the above example is for example as follows:

for a face image set including 2000 face images of different resolutions, randomly selecting 200 face images, and manually labeling the 200 face images, thereby obtaining 200 image samples;

using the 200 image samples to train the lightweight neural network for the first time;

randomly selecting 200 face images from the 1800 unlabeled images in the face image set, and inputting the 200 face images selected from the 1800 unlabeled images into the lightweight neural network obtained through the first training for prediction, thereby obtaining definition labels of the 200 face images selected from the 1800 unlabeled images;

determining whether a proportion of the definition labels that need manual correction, in the definition labels of the 200 face images selected from the 1800 unlabeled images (i.e., a proportion of the definition labels that are predicted incorrectly, or proportion of noise), exceeds 10%;

if the proportion does not exceed 10%, which means that a prediction accuracy of the lightweight neural network obtained through the first training has met requirements (it should be noted that the prediction accuracy of the lightweight neural network obtained through the first training is usually not high, and the probability that the proportion of the definition labels that are predicted incorrectly does not exceed 10%, is relatively small), ending the training process;

if the proportion exceeds 10%, which means that the prediction accuracy of the lightweight neural network obtained through the first training does not meet requirements, correcting the definition labels that need manual correction, and taking the 200 face images (including face images with definition labels which do not need manual correction or which are predicted correctly, and face images with corrected definition labels), thereby expanding the 200 image samples obtained in the step S110 for the first time to obtain 400 image samples;

using the 400 image samples after the first expansion to train the lightweight neural network for the second time;

randomly selecting 300 face images from the 1600 unlabeled images in the face image set, and inputting the 300 face images selected from the 1600 unlabeled images into the lightweight neural network obtained through the second training for prediction, thereby obtaining definition labels of the 300 face images selected from the 1600 unlabeled images;

determining whether a proportion of the definition labels that need manual correction, in the definition labels of the 300 face images selected from the 1600 unlabeled images (i.e., a proportion of the definition labels that are predicted incorrectly), exceeds 10%;

if the proportion does not exceed 10%, which means that a prediction accuracy of the lightweight neural network obtained through the second training has met requirements, ending the training process;

if the proportion exceeds 10%, which means that the prediction accuracy of the lightweight neural network obtained through the second training does not met requirements, correcting the definition labels that need manual correction, and taking the 300 face images, thereby expanding the 400 image samples, which are obtained through the first expansion, for the second time to obtain 700 image samples;

using the 700 image samples after the second expansion to train the lightweight neural network for the third time; then randomly selecting unlabeled face images for prediction, and determining a proportion of definition labels that need to be corrected in prediction results, until the lightweight neural network with prediction accuracy that meets the requirements is obtained.

In summary, the foregoing implementation uses the neural network obtained by staged training to expand the image samples, and then further uses the expanded image samples to train the neural network, which are executed cyclically to finally achieve a neural network with a prediction accuracy that meets the requirements. The foregoing implementation adopts a training program that combines progressive training and expanded image samples, which can effectively reduce training costs, improve training efficiency, and improve the prediction accuracy of the trained neural network.

It should be noted that although the manual correction will also incur training costs and affect the training efficiency, compared with the method in which all image samples are manually labeled with definition labels, firstly, the number of required manual corrections is smaller; and secondly, the correction is more simpler and more efficient than labeling, because inaccurately predicted definition labels may be used as a reference. Further, as the number of training increases, the number of required corrections will decrease, and the inaccurately predicted definition labels will get closer and closer to correct values, that is, the reference of the incorrectly predicted definition labels will increase.

In one possible implementation, each time the number of images that use the trained neural network for definition prediction is gradually increased. In this way, training efficiency can be further improved.

Following the previous example, for example, after the first training, 200 face images are randomly selected from the face image set and input into the lightweight neural network obtained in the first training for prediction; after the second training, 300 face images are randomly selected from the face image set and input into the lightweight neural network obtained in the second training for prediction; after the third training, 400 face images are randomly selected from the face image set and input into the lightweight neural network obtained in the third training for prediction, and so on.

As shown in FIG. 2, another embodiment of the present application provides a method for training a neural network of predicting face image definition, including the following steps S110 and S120.

Step S110: obtaining a face image set and definition labels of some face images in the face image set, thereby obtaining image samples with the definition labels and to-be-expanded images except for the image samples.

In one specific example, the definition label may be a definition level. For example, a total of five definition levels, such as definition levels 1-5, may be defined. The definition level 5 means very clear, and its standard is that face contour and facial features are very clear and a face recognition effect is very good when applied to face recognition; the definition level 4 means clear, and its standard is that face contour and facial features are clear and a face recognition effect is good when applied to face recognition; the definition level 3 means middle level, and its standard is that face contour is clear and facial features are not clear, and it is barely applied to face recognition; the definition level 2 means relatively fuzzy, and its standard is that face contour is not clear and facial features are basically invisible, and it basically cannot be applicable to face recognition; the definition level 1 means very fuzzy, and its standard is that face contour and facial features are invisible, and it certainly cannot be applicable to face recognition.

In one possible implementation, the face image set includes multiple groups of face images, and face images in each group include the same target (that is, faces in each group of face images belong to the same person). The obtaining definition labels of some face images in the face image set, includes: obtaining a definition label of a face image with the highest definition in each group of face images, thereby obtaining image samples with the definition labels.

In one specific example, for example, a to-be-trained neural network is a lightweight neural network, and about 2000 image samples are used for training. Then, according to the solution of obtaining definition labels of all face images by manual labeling in the related art, it is necessary to manually label the definition labels of about 2000 face images. While in the step S110 of this embodiment, the face image set includes 40 groups of face images. Each group of face images include face images of one person. Each group of face images include 50 face images of different definitions, and the 40 groups of face images constitute a face image set including a total of 2000 face images. For this face image set, it is only necessary to manually select a face image with the highest or clearest definition from each group, and label definition labels of the selected 40 face images as the definition level 5, thereby obtaining 40 image samples with definition labels. The remaining unlabeled 1960 face images (including 49 unlabeled face images in each of the 40 groups) are used as to-be-expanded images.

Step S120: extracting definition features of at least some face images in the face image set, obtaining definition labels of at least some face images in the to-be-expanded images according to the extracted definition features, correcting the definition labels of the at least some face images in the to-be-expanded images to expand the image samples, and using the image samples to train a neural network of predicting face image definition, thereby obtaining a trained neural network.

In one possible implementation, the correcting the definition labels of the at least some face images in the to-be-expanded images in the step S120 includes:

displaying a correction interface, where the correction interface includes a correction control, at least some face images in the to-be-expanded images and corresponding definition labels; and in response to operation of the correction control, correcting the definition label of the corresponding face image in the correction interface.

Based on the correction operation interaction mode provided in this implementation, a user can conveniently view face images in the to-be-expanded images and corresponding definition labels, and can conveniently and efficiently realize correction of the definition labels.

Following the foregoing example, the computer device that implements the method for training a neural network provided in this embodiment may provide a correction interface. The correction interface displays at least some face images in the to-be-expanded images and corresponding definition labels obtained according to the extracted definition feature (i.e., face images with to-be-corrected definition labels and the to-be-corrected definition labels), and a correction control (for example, the correction control may include five selection controls representing definition levels 1-5 below the face image). In response to operations of the correction control by the annotator, a corrected definition label of the corresponding face image is obtained. The face image displayed on the correction interface cannot be too small, otherwise the annotator will not be able to see clearly. For example, one correction interface displays three face images and a page turning control. In response to operations of the page turning tool by the annotator, followup face images with to-be-corrected definition labels are displayed.

Figure 4:
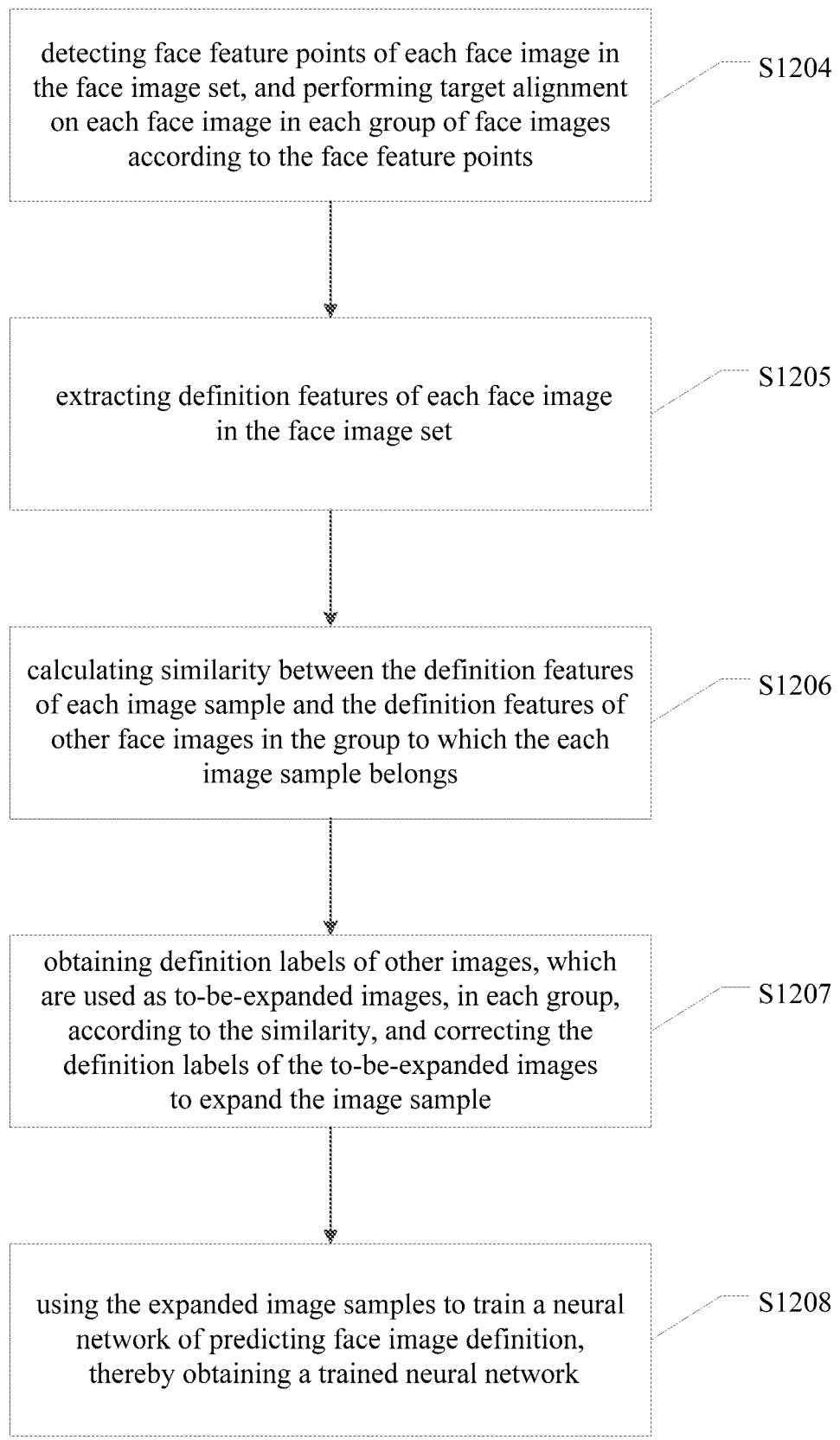
FIG. 4 is a flowchart of sub-steps of a step S120 in FIG. 2 according to another embodiment of the present application.

In one possible implementation, as shown in FIG. 4, the step S120 includes the following sub-steps S1204 to S1208.

Step S1204: detecting face feature points of each face image in the face image set, and performing target alignment on each face image in each group of face images according to the face feature points.

Following the previous example, in the step S1204, a face feature point detector such as a practical facial landmark detector (PFLD) in related art can be used to detect face feature points of each face image in the 2000 face images included in the face image set. The face feature points include, for example, a center of a left eye, a center of a right eye, a tip of a nose, a left corner of a mouth, and a right corner of the mouth. Then, according to the detected face feature points, face alignment is performed on the 50 face images included in each group through similarity transformation or radial transformation, thereby improving accuracy and effectiveness of subsequent definition feature extraction and similarity calculations. It should be noted that the aforementioned face alignment is only for various face images in each group, and face alignment between groups is not required.

Step S1205: extracting definition features of each face image in the face image set.

Following the previous example, in the step S1205, face feature extraction models such as a trained FaceNet network in the related art, can be used to extract the definition features, such as 512-dimensional feature vector, of each face image of the 2000 face images included in the face image set.

Step S1206: calculating similarity between the definition features of each image sample and the definition features of other face images in the group to which the each image sample belongs.

Following the foregoing example, in the step S1206, the similarity between the definition features of each image sample and the definition features of other face images in the group to which the each image sample belongs, can be calculated through a similarity algorithm based on Euclidean distance or cosine distance. For example, for the first group of face images, a Euclidean distance between the definition features of the image sample (which may be referred as a reference image in the similarity calculation) in the first group and the definition features of the remaining 49 unlabeled face images in the first group is calculated, thereby obtaining similarity scores of the remaining 49 unlabeled face images in the first group. The same processing is also performed on the remaining 39 groups of face images.

Step S1207: obtaining definition labels of other images, which are used as to-be-expanded images, in each group, according to the similarity, and correcting the definition labels of the to-be-expanded images to expand the image samples.

Following the previous example, in the step S1207, for example, the similarity scores of 1960 unlabeled face images other than 40 image samples obtained in the step S1206 are values in a range of 0 and 1; and the range of 0 to 1 may be divided into 5 value ranges corresponding to 5 definition levels, thereby obtaining definition levels, i.e., definition labels, of 1960 unlabeled face images. Then, the definition labels of the 1960 unlabeled face images, which are obtained according to similarity calculation, are corrected, thereby expanding the image samples to 2000 image samples. That is, according to the extracted definition features, definition labels of all images (1960 images) in the to-be-expanded images (1960 images) are obtained through similarity calculation, and the definition labels of all images (1960 images) in the to-be-expanded images are corrected to expand the image samples.

Step S1208: using the expanded image samples to train a neural network of predicting face image definition, thereby obtaining a trained neural network.

In this implementation, on the basis that the face image set includes multiple groups of face images and the face images in each group contain the same target, the image samples are expanded by calculating similarity between definition features of one image sample including a person's face and definition features of unlabeled face images including the same person's face, thereby effectively reducing training costs, improving training efficiency, and improving prediction accuracy of the trained neural network.

It should be noted that although the manual correction will also incur training costs and affect the training efficiency, compared with the method in which all image samples are manually labeled with definition labels, firstly, the accuracy of the definition labels obtained through similarity calculation is high and then the number of required manual corrections is smaller; and secondly, the correction is more simpler and more efficient than labeling, because inaccurately predicted definition labels may be used as a reference.

As shown in FIG. 2, another embodiment of the present application provides a method for training a neural network of predicting face image definition, including the following steps S110 and S120.

Step S110: obtaining a face image set and definition labels of some face images in the face image set, thereby obtaining image samples with the definition labels and to-be-expanded images except for the image samples.

In one specific example, the definition label may be a definition level. For example, a total of five definition levels, such as definition levels 1-5, may be defined. The definition level 5 means very clear, and its standard is that face contour and facial features are very clear and a face recognition effect is very good when applied to face recognition; the definition level 4 means clear, and its standard is that face contour and facial features are clear and a face recognition effect is good when applied to face recognition; the definition level 3 means middle level, and its standard is that face contour is clear and facial features are not clear, and it is barely applied to face recognition; the definition level 2 means relatively fuzzy, and its standard is that face contour is not clear and facial features are basically invisible, and it basically cannot be applicable to face recognition; the definition level 1 means very fuzzy, and its standard is that face contour and facial features are invisible, and it certainly cannot be applicable to face recognition.

In one possible implementation, the face image set includes multiple groups of face images, and face images in each group include the same target (that is, faces in each group of face images belong to the same person). The obtaining definition labels of some face images in the face image set, includes: obtaining a definition label of a face image with the highest definition in each group of face images, thereby obtaining image samples with the definition labels.

In one specific example, for example, a to-be-trained neural network is a lightweight neural network, and about 2000 image samples are used for training. Then, according to the solution of obtaining definition labels of all face images by manual labeling in the related art, it is necessary to manually label the definition labels of about 2000 face images. While in the step S110 of this embodiment, the face image set includes 40 groups of face images. Each group of face images include face images of one person. Each group of face images include 50 face images of different definitions, and the 40 groups of face images constitute a face image set including a total of 2000 face images. For this face image set, it is only necessary to manually select a face image with the highest or clearest definition from each group, and label definition labels of the selected 40 face images as the definition level 5, thereby obtaining 40 image samples with definition labels. The remaining unlabeled 1960 face images (including 49 unlabeled face images in each of the 40 groups) are used as to-be-expanded images.

Step S120: extracting definition features of at least some face images in the face image set, obtaining definition labels of at least some face images in the to-be-expanded images according to the extracted definition features, correcting the definition labels of the at least some face images in the to-be-expanded images to expand the image samples, and using the image samples to train a neural network of predicting face image definition, thereby obtaining a trained neural network.

In one possible implementation, the correcting the definition labels of the at least some face images in the to-be-expanded images in the step S120 includes:

displaying a correction interface, where the correction interface includes a correction control, at least some face images in the to-be-expanded images and corresponding definition labels; and in response to operation of the correction control, correcting the definition label of the corresponding face image in the correction interface.

Based on the correction operation interaction mode provided in this implementation, a user can conveniently view face images in the to-be-expanded images and corresponding definition labels, and can conveniently and efficiently realize correction of the definition labels.

Following the foregoing example, the computer device that implements the method for training a neural network provided in this embodiment may provide a correction interface. The correction interface displays at least some face images in the to-be-expanded images and corresponding definition labels obtained according to the extracted definition feature (i.e., face images with to-be-corrected definition labels and the to-be-corrected definition labels), and a correction control (for example, the correction control may include five selection controls representing definition levels 1-5 below the face image). In response to operations of the correction control by the annotator, a corrected definition label of the corresponding face image is obtained. The face image displayed on the correction interface cannot be too small, otherwise the annotator will not be able to see clearly. For example, one correction interface displays three face images and a page turning control. In response to operations of the page turning tool by the annotator, follow-up face images with to-be-corrected definition labels are displayed.

Figure 5:
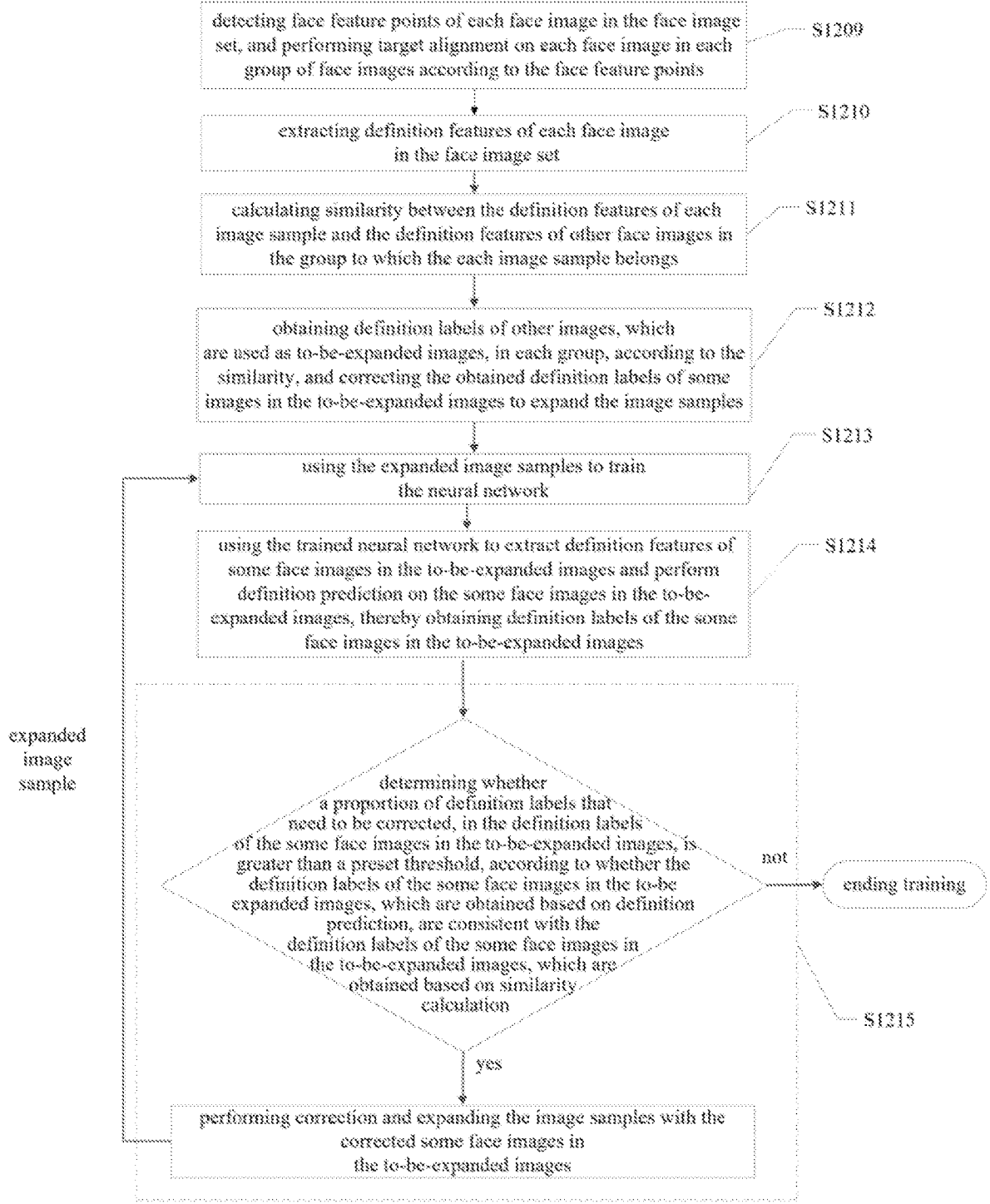
FIG. 5 is a flowchart of sub-steps of a step S120 in FIG. 2 according to another embodiment of the present application.

In one possible implementation, as shown in FIG. 5, the step S120 includes the following sub-steps S1209 to S1215.

Step S1209: detecting face feature points of each face image in the face image set, and performing target alignment on each face image in each group of face images according to the face feature points.

Following the previous example, in the step S1209, a face feature point detector such as a practical facial landmark detector (PFLD) in related art can be used to detect face feature points of each face image in the 2000 face images included in the face image set. The face feature points include, for example, a center of a left eye, a center of a right eye, a tip of a nose, a left corner of a mouth, and a right corner of the mouth. Then, according to the detected face feature points, face alignment is performed on the 50 face images included in each group through similarity transformation or radial transformation, thereby improving accuracy and effectiveness of subsequent definition feature extraction and similarity calculations. It should be noted that the aforementioned face alignment is only for various face images in each group, and face alignment between groups is not required.

Step S1210: extracting definition features of each face image in the face image set.

Following the previous example, in the step S1210, face feature extraction models such as a trained FaceNet network in the related art, can be used to extract the definition features, such as 512-dimensional feature vector, of each face image of the 2000 face images included in the face image set Step S1211: calculating similarity between the definition features of each image sample and the definition features of other face images in the group to which the each image sample belongs.

Following the foregoing example, in the step S1211, the similarity between the definition features of each image sample and the definition features of other face images in the group to which the each image sample belongs, can be calculated through a similarity algorithm based on Euclidean distance or cosine distance. For example, for the first group of face images, a Euclidean distance between the definition features of the image sample (which may be referred as a reference image in the similarity calculation) in the first group and the definition features of the remaining 49 unlabeled face images in the first group is calculated, thereby obtaining similarity scores of the remaining 49 unlabeled face images in the first group. The same processing is also performed on the remaining 39 groups of face images.

Step S1212: obtaining definition labels of other images, which are used as to-be-expanded images, in each group, according to the similarity, and correcting the obtained definition labels of some images in the to-be-expanded images to expand the image samples.

Following the previous example, in the step S1212, for example, the similarity scores of 1960 unlabeled face images other than 40 image samples obtained in the step S1211 are values in a range of 0 and 1; and the range of 0 to 1 may be divided into 5 value ranges corresponding to 5 definition levels, thereby obtaining definition levels, i.e., definition labels, of 1960 unlabeled face images. Then, 160 face images are randomly selected from the 1960 unlabeled face images, and definition labels of the 160 unlabeled face images, which are obtained according to similarity calculation, are corrected, thereby expanding the image samples from 40 image samples obtained through the step S110 to 200 image samples. That is, according to the extracted definition features, definition labels of all images (1960 images) in the to-be-expanded images (1960 images) are obtained through similarity calculation, and the definition labels of some images (160 images) in the to-be-expanded images are corrected to expand the image samples.

Step S1213: using the expanded image samples to train the neural network.

Following the previous example, the image samples are expanded to 200 image samples in the step S1212, and then the step S1213 is executed for the first time. That is, when training the lightweight neural network for the first time, the 200 image samples with definition labels obtained in the step S1212 are used to train the neural network.

Step S1214: using the trained neural network to extract definition features of some face images in the to-be-expanded images and perform definition prediction on the some face images in the to-be-expanded images, thereby obtaining definition labels of the some face images in the to-be-expanded images.

Following the previous example, when the step S1214 is executed for the first time, 200 face images are randomly selected from unlabeled 1800 face images except for the 40 face images initially used as image samples and 160 face images of which the definition labels have been corrected in the step S1212, as to-be-expanded images, and are input into the lightweight neural network obtained through the first training, thereby using the lightweight neural network obtained through the first training to perform definition prediction on the 200 to-be-expanded images and then obtaining definition labels (i.e., definition label prediction values) of the 200 to-be-expanded images.

Step S1215: determining whether a proportion of definition labels that need to be corrected, in the definition labels of the some face images in the to-be-expanded images, is greater than a preset threshold, according to whether the definition labels of the some face images in the to-be-expanded images, which are obtained based on definition prediction, are consistent with the definition labels of the some face images in the to-be-expanded images, which are obtained based on similarity calculation; if the proportion is greater than the preset threshold, performing correction and expanding the image samples with the corrected some face images in the to-be-expanded images, and using the expanded image samples to train the neural network; if the proportion is less than the preset threshold, ending the training, thereby obtaining the trained neural network.

Following the previous example, when the step S1215 is executed for the first time, the definition labels of the 200 to-be-expanded images obtained when the step S1214 is executed for the first time, are compared with the definition labels of the 200 to-be-expanded images obtained based on similarity calculation in the step S1212. If definition labels of one to-be-expanded image obtained in the foregoing two ways are different, it is determined that the definition label of the one to-be-expanded image needs to be corrected. If definition labels of one to-be-expanded image obtained in the foregoing two ways are the same, it is determined that no correction is needed. In this way, the proportion of definition labels that need to be corrected, in the definition labels of the 200 to-be-expanded images, and it is determined whether the proportion is greater than a preset threshold which is, for example, 10%. If the proportion is greater than 10%, the definition labels that need to be corrected, are corrected, and then the image samples are expanded with the 200 to-be-expanded images with corrected definition labels. That is, the 200 face images with the corrected definition labels and the 200 image samples obtained in the step S1212 are together as image samples, and then the image samples are expanded to 400. After the expansion, it is returned to the step S1213 (which is after performing the step S1213 for the first time, that is, performing the step S1213 for second time, i.e., using the 400 image samples to train the neural network for the second time; each subsequent time the step S1213 is performed for training, the number of the image samples will increase compared to the previous training). If the proportion is less than or equal to 10%, the training ends, thereby obtaining the trained neural network.

In this implementation, on the basis that the face image set includes multiple groups of face images and the face images in each group contain the same target, the image samples are expanded by calculating similarity between definition features of one image sample including a person's face and definition features of unlabeled face images including the same person's face, in addition to using the neural network obtained by staged training to expand the image samples, and then the expanded image samples are used to train the neural network, which are executed cyclically to finally achieve a neural network with a prediction accuracy that meets the requirements, thereby effectively reducing training costs, improving training efficiency, and improving prediction accuracy of the trained neural network.

Those skilled in the art should understand that, in the foregoing embodiments, although an execution order of steps in the process is described according to step numbers such as S110, S120, S1201, S1202, it does not mean that these steps have to be executed in this order, as long as they are not against logic.

Another embodiment of the present application provides a neural network of predicting face image definition. The neural network can be obtained through training according to the training method provided in the foregoing embodiment.

In one possible implementation, the neural network is a lightweight neural network.

The lightweight neural network used in this implementation has advantages of fewer parameters and less calculations, which is conducive to realize efficient training and improve prediction efficiency, and is suitable for a face image definition prediction scene which requires high real-time performance.

Figure 6:
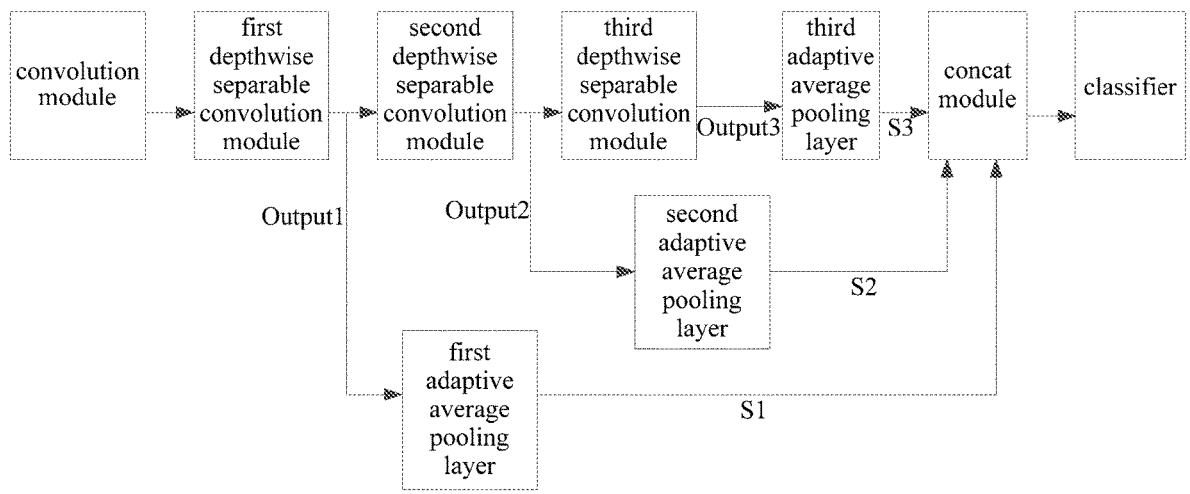
FIG. 6 is a schematic diagram showing network structure of a lightweight neural network.

In one possible implementation, as shown in FIG. 6, the lightweight neural network includes a convolution module, a first depthwise separable convolution module, a second depthwise separable convolution module and a third depthwise separable convolution module, which are sequentially connected. The lightweight neural network further includes a first adaptive average pooling layer connected to the first depthwise separable convolution module, a second adaptive average pooling layer connected to the second depthwise separable convolution module, a third adaptive average pooling layer connected to the third depthwise separable convolution module, a concat module which is respectively connected to the first adaptive average pooling layer, the second adaptive average pooling layer and the third adaptive average pooling layer, and a classifier connected to the concat module.

The specific network structure of the lightweight neural network used in this implementation can increase expressive ability of the models by fusing features of three different scales, thereby improving accuracy of image definition prediction, realizing efficient training and improving prediction efficiency.

In one specific example, the specific structure of the lightweight neural network shown in FIG. 6 is shown in the following table 1.

TABLE 1

| Output | Input | Operator | Number of channels (c) | Number of repeat operations (n) | Step size (s) |
|---|---|---|---|---|---|
| | 112 × 112 × 3 | Conv2d | 16 | 1 | 2 |
| | 56 × 56 × 16 | Bottlenect-1 | 32 | 1 | 1 |
| | 56 × 56 × 32 | Bottlenect-2 | 32 | 1 | 2 |
| | 28 × 28 × 32 | Bottlenect-3 | 32 | 1 | 1 |
| | 28 × 28 × 32 | Bottlenect-4 | 64 | 1 | 2 |
| Output1 | 14 × 14 × 64 | Bottlenect-5 | 64 | 3 | 1 |

TABLE 1-continued

| Output | Input | Operator | Number of channels (c) | Number of repeat operations (n) | Step size (s) |
|---|---|---|---|---|---|
| | 14 × 14 × 64 | Bottlenect-6 | 128 | 1 | 2 |
| Output2 | 7 × 7 × 128 | Bottlenect-7 | 128 | 2 | 1 |
| | 7 × 7 × 128 | Bottlenect-8 | 256 | 1 | 2 |
| Output3 | 4 × 4 × 256 | Bottlenect-9 | 256 | 1 | 1 |
| S1 | 14 × 14 × 64 | AdaptiveAvgPool2d-1 | 64 | 1 | — |
| S2 | 7 × 7 × 128 | AdaptiveAvgPool2d-2 | 128 | 1 | — |
| S3 | 4 × 4 × 256 | AdaptiveAvgPool2d-3 | 256 | 1 | — |
| (S1, S2, S3) | (64 + 128 + 256) | Concat | 5 | — | — |

Figure 7:
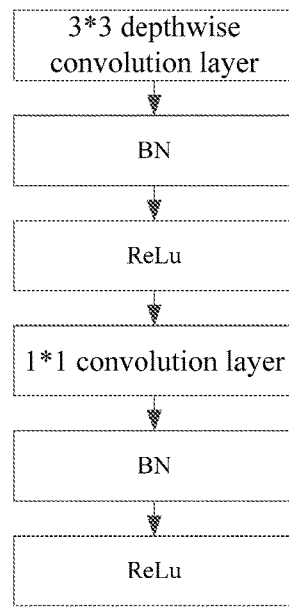
FIG. 7 is a schematic diagram of a bottleneck layer.

With reference to FIG. 6 and Table 1, in this example, the convolution module includes a convolution layer Conv2d; the first depthwise separable convolution module includes five bottleneck layers including Bottlenect-1 to Bottlenect-5; the second depthwise separable convolution module includes two bottleneck layers including Bottlenect-6 and Bottlenect-7; and the third depthwise separable convolution module includes two bottleneck layers including Bottlenect-8 and Bottlenect-9. The depthwise separable convolution module can greatly reduce an amount of parameters and an amount of calculation while ensuring extraction of features. In the bottleneck layer, 3*3 depthwise convolution operation is first performed, and then 1*1 pointwise convolution operation is performed. As shown in FIG. 7, the bottleneck layer includes 3*3 depthwise convolution layer, a batch normalization (BN) layer, a rectified linear unit (ReLU), 1*1 convolution layer, a batch normalization (BN) layer and a rectified linear unit (ReLU), which are sequentially connected.

In this example, an output S1 of the first adaptive average pooling layer (AdaptiveAvgPool2d-1) is 1×1×64; an output S2 of the second adaptive average pooling layer (AdaptiveAvgPool2d-2) is 1×1×128; and an output S3 of the third adaptive average pooling layer (AdaptiveAvgPool2d-3) is 1×1×256. S1, S2, and S3 are spliced and fused by the concat module, and then sent to the classifier such as Softmax for definition level classification to obtain definition prediction results.

The foregoing structures of the bottleneck layer, the number of bottleneck layers included in each depthwise separable convolution module are only examples, and this embodiment does not limit this. Therefore, the three pooling layers adopt the adaptive average pooling layers, which can support flexible adjustment of the structure of the three depthwise separable convolution modules.

Another embodiment of the present application provides a face image definition prediction method, including:

inputting a to-be-predicted face image into the neural network provided in the foregoing embodiment or a neural network trained by the training method provided in the foregoing embodiment, thereby obtaining an image definition prediction value.

Figure 8:
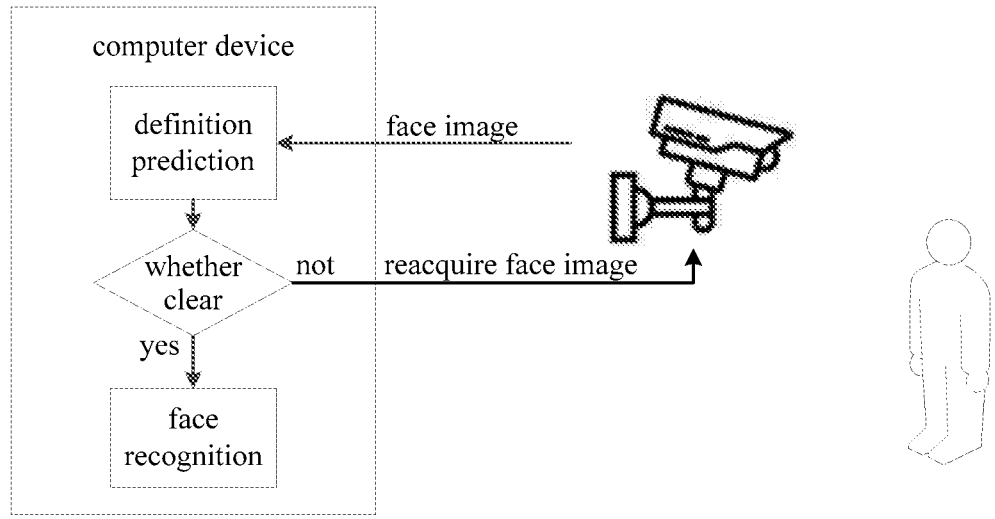
FIG. 8 is a schematic diagram of a scene in which a method for predicting face image definition according to an embodiment of the present application is applied to face recognition.

In one specific example, as shown in FIG. 8, when the face image definition prediction method provided in this embodiment is applied to an application scenario of face recognition, after a camera collects a face image, the face image is sent to a computer device. The computer device inputs the face image into the neural network to predict whether the face image is clear. If a prediction result is that the face image is clear, face recognition is performed on the face image; if a prediction result is that the face image is not clear, the camera is controlled to reacquire a face image.

Figure 9:
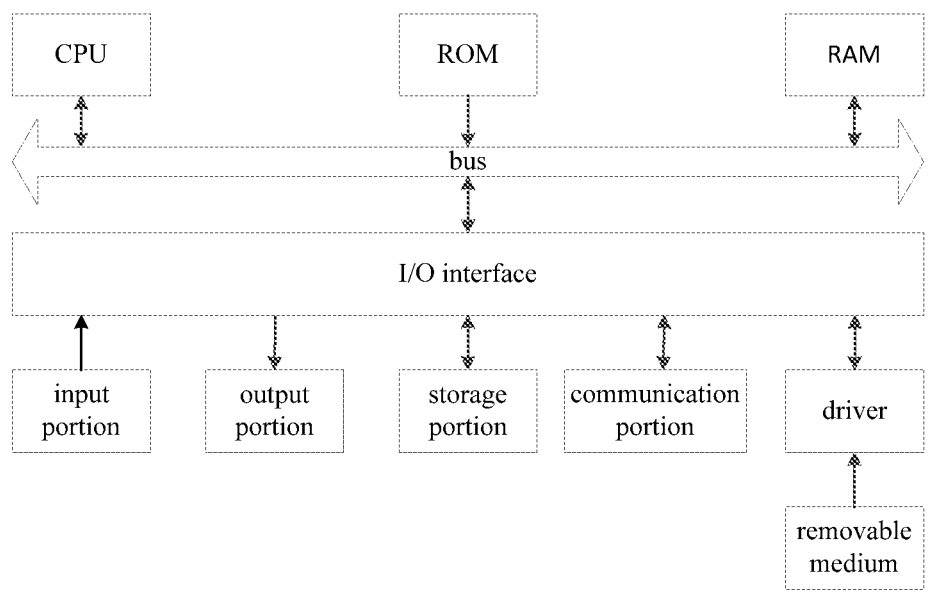
FIG. 9 is a schematic diagram of a computer system.

As shown in FIG. 9, a computer system suitable for executing the method for training a neural network of predicting image definition provided in the foregoing embodiment includes a central processing unit (CPU), which may execute various appropriate actions and processes in accordance with a program stored in a read-only memory (ROM) or a program loaded into a random access memory (RAM) from a storage portion. The RAM also stores various programs and data required by operations of the computer system. The CPU, the ROM and the RAM are connected to each other through a bus. An input/output (I/O) interface is also connected to the bus.

The following components are connected to the I/O interface: an input portion including a keyboard, a mouse etc.; an output portion including a cathode ray tube (CRT), a liquid crystal display device (LCD), a speaker etc.; a storage portion including a hard disk and the like; and a communication portion including a network interface card, such as a LAN card and a modem. The communication portion performs communication processes via a network, such as the Internet. A driver is also connected to the I/O interface as required. A removable medium, such as a magnetic disk, an optical disk, a magneto-optical disk, and a semiconductor memory, may be installed on the driver, to facilitate the retrieval of a computer program from the removable medium, and the installation thereof on the storage portion as needed.

In particular, according to an embodiment of the present application, the process described above may be implemented in a computer software program. For example, an embodiment of the present application includes a computer program product, which includes a computer program that is tangibly embedded in a machine-readable medium. The computer program includes program codes for executing the method as illustrated in the flow chart. In such an embodiment, the computer program may be downloaded and installed from a network via the communication portion, and/or may be installed from the removable media. The computer program, when executed by the CPU, implements the functions as defined by the methods of the present application.

The flowcharts and block diagrams in the figures illustrate architectures, functions and operations that may be implemented according to the system, the method and the computer program product of the various embodiments of the present application. In this regard, each block in the flowcharts and block diagrams may represent a module, a program segment, or a code portion. The module, the program segment, or the code portion includes one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

A computer system suitable for executing the image definition prediction method provided in the foregoing embodiment has a similar structure to the computer system shown in FIG. 9, and will not be repeated here.

In another aspect, the present application further provides a non-volatile computer-readable storage medium. The computer-readable storage medium may be a computer-readable storage medium included in the electronic device described in the foregoing embodiment, or a stand-alone computer-readable storage medium which has not been assembled into the electronic device.

The non-volatile computer-readable storage medium stores one or more programs. The one or more programs, when executed by one or more processors, cause the one or more processors to implement: obtaining a face image set and definition labels of some face images in the face image set, thereby obtaining image samples with the definition labels and to-be-expanded images except for the image samples; and extracting definition features of at least some face images in the face image set, obtaining definition labels of at least some face images in the to-be-expanded images according to the extracted definition features, correcting the definition labels of the at least some face images in the to-be-expanded images to expand the image samples, and using the image samples to train a neural network of predicting face image definition, thereby obtaining a trained neural network.

Alternatively, the foregoing non-volatile computer-readable storage medium stores one or more programs. The one or more programs, when executed by one or more processors, cause the one or more processors to implement: inputting a to-be-predicted face image into the neural network of predicting face image definition provided in the foregoing embodiment, thereby obtaining an image definition prediction value.

In the descriptions of the present application, it needs to be understood that orientation or positional relationship indicated by the term of "center", "up", "down", "front", "rear", "left", "right", "vertical", "horizontal", "top", "bottom", "inside", or "outer", etc., is based on the drawings, and are only for the convenience of describing the present application and simplifying the description, and not intended to indicate or imply that the device or element as referred to must have a specific orientation or be constructed and operated in a specific orientation, and therefore cannot be understood as a limitation to the present application.

The terms "first" and "second" are used for descriptive purposes only, and cannot be understood as indicating or implying relative importance or implicitly indicating the quantity of technical features as referred to. Therefore, the features defined by "first" and "second" may explicitly or implicitly include one or more of the features. In the descriptions of the present application, unless otherwise stated, "a plurality" means two or more.

In the description of the present application, it should be noted that the term of "installation", "connected", or "connecting" should be understood in a broad sense unless explicitly stated and limited. For example, it may be fixed or removable connection, or may be integral connection; it may be direct connection or indirect connection through an intermediate medium, or, it may be internal communication of two elements. For those of ordinary skill in the art, the specific meanings of the above terms in the present application may be understood on a case-by-case basis.

In the descriptions of this specification, specific features, structures, materials, or characteristics may be combined in a suitable manner in any one or more embodiments or examples.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for training a neural network of predicting image definition, comprising:

obtaining an image set and definition labels of some images in the image set, thereby obtaining image samples with the definition labels and to-be-expanded images except for the image samples; and extracting definition features of at least some images in the image set, obtaining definition labels of at least some images in the to-be-expanded images according to the extracted definition features, correcting the definition labels of the at least some images in the to-be-expanded images to expand the image samples, and using the image samples to train the neural network of predicting image definition, thereby obtaining a trained neural network;

wherein the extracting definition features of at least some images in the image set, obtaining definition labels of at least some images in the to-be-expanded images according to the extracted definition features, correcting the definition labels of the at least some images in the to-be-expanded images to expand the image samples, and using the image samples to train the neural network of predicting image definition, thereby obtaining a trained neural network, includes:

using the image samples to train the neural network;

using the trained neural network to extract definition features of the at least some images in the to-be-expanded images and perform definition prediction on the at least some images in the to-be-expanded images, thereby obtaining the definition labels of the at least some images in the to-be-expanded images; and determining whether a proportion of definition labels that need to be corrected, in the definition labels of the at least some images in the to-be-expanded images, is greater than a preset threshold; if the proportion is greater than the preset threshold, performing correction and expanding the image samples with the corrected at least some images in the to-be-expanded images, and returning to use the image samples to train the neural network; if the proportion is less than the preset threshold, ending the training, thereby obtaining the trained neural network.

2. The method according to claim 1, wherein each time the number of images which use the trained neural network for definition prediction is gradually increased.

3. The method according to claim 1, wherein the image set includes multiple groups of images, and images in each group include a same target; the obtaining definition labels of some images in the image set, includes: obtaining a definition label of one image with the highest definition in each group of images, thereby obtaining image samples with the definition labels.

4. The method according to claim 3, wherein the extracting definition features of at least some images in the image set, obtaining definition labels of at least some images in the to-be-expanded images according to the extracted definition features, correcting the definition labels of the at least some images in the to-be-expanded images to expand the image samples, and using the image samples to train the neural network of predicting image definition, thereby obtaining a trained neural network, includes:
  extracting definition features of each image in the image set;
  calculating similarity between the definition features of each image sample and the definition features of other images in the group to which the each image sample belongs;
  obtaining definition labels of other images, which are used as to-be-expanded images, in each group, according to the similarity, and correcting the definition labels of the to-be-expanded images to expand the image samples;
  using the expanded image samples to train the neural network of predicting image definition, thereby obtaining the trained neural network.

5. The method according to claim 4, wherein before extracting definition features of each image in the image set, the method further includes:
  detecting target feature points of each image in the image set, and performing target alignment on each image in each group of images according to the target feature points.

6. The method according to claim 3, wherein the extracting definition features of at least some images in the image set, obtaining definition labels of at least some images in the to-be-expanded images according to the extracted definition features, correcting the definition labels of the at least some images in the to-be-expanded images to expand the image samples, and using the image samples to train the neural network of predicting image definition, thereby obtaining a trained neural network, includes:
  extracting definition features of each image in the image set;
  calculating similarity between the definition features of each image sample and the definition features of other images in the group to which the each image sample belongs;
  obtaining definition labels of other images, which are used as to-be-expanded images, in each group, according to the similarity, and correcting the obtained definition labels of some images in the to-be-expanded images to expand the image samples;
  using the expanded image samples to train the neural network;
  using the trained neural network to extract definition features of some images in the to-be-expanded images and perform definition prediction on the some images in the to-be-expanded images, thereby obtaining definition labels of the some images in the to-be-expanded images;
  determining whether a proportion of definition labels that need to be corrected, in the definition labels of the some images in the to-be-expanded images, is greater than a preset threshold, according to whether the definition labels of the some images in the to-be-expanded images, which are obtained based on definition prediction, are consistent with the definition labels of the some images in the to-be-expanded images, which are obtained based on similarity calculation; if the proportion is greater than the preset threshold, performing correction and expanding the image samples with the corrected some images in the to-be-expanded images, and using the expanded image samples to train the neural network; if the proportion is less than the preset threshold, ending the training, thereby obtaining the trained neural network.

7. The method according to claim 1, wherein the correcting the definition labels of the at least some images in the to-be-expanded images, includes:
  displaying a correction interface, wherein the correction interface includes a correction control, at least some images in the to-be-expanded images and corresponding definition labels; and
  in response to operation of the correction control, correcting the definition label of the corresponding image in the correction interface.

8. The method according to claim 1, wherein the image set is a face image set.

9. A neural network of predicting image definition, comprising a neural network obtained through training according to the method of claim 1.

10. The neural network according to claim 9, wherein the neural network is a lightweight neural network.

11. The neural network according to claim 10, wherein the lightweight neural network includes a convolution module, a first depthwise separable convolution module, a second depthwise separable convolution module and a third depthwise separable convolution module, which are sequentially connected; the lightweight neural network further includes a first adaptive average pooling layer connected to the first depthwise separable convolution module, a second adaptive average pooling layer connected to the second depthwise separable convolution module, a third adaptive average pooling layer connected to the third depthwise separable convolution module, a concat module which is respectively connected to the first adaptive average pooling layer, the second adaptive average pooling layer and the third adaptive average pooling layer, and a classifier connected to the concat module.

12. A computer device, comprising: a memory, a processor, and a computer program stored in the memory and executable on the processor, wherein the processor executes the program to implement:
  obtaining an image set and definition labels of some images in the image set, thereby obtaining image samples with the definition labels and to-be-expanded images except for the image samples; and
  extracting definition features of at least some images in the image set, obtaining definition labels of at least some images in the to-be-expanded images according to the extracted definition features, correcting the definition labels of the at least some images in the to-be-expanded images to expand the image samples, and using the image samples to train the neural network of predicting image definition, thereby obtaining a trained neural network;

wherein when extracting definition features of at least some images in the image set, obtaining definition labels of at least some images in the to-be-expanded images according to the extracted definition features, correcting the definition labels of the at least some images in the to-be-expanded images to expand the image samples, and using the image samples to train the neural network of predicting image definition, thereby obtaining a trained neural network, the processor executes the program to implement:

using the image samples to train the neural network;

using the trained neural network to extract definition features of the at least some images in the to-be-expanded images and perform definition prediction on the at least some images in the to-be-expanded images, thereby obtaining the definition labels of the at least some images in the to-be-expanded images; and determining whether a proportion of definition labels that need to be corrected, in the definition labels of the at least some images in the to-be-expanded images, is greater than a preset threshold; if the proportion is greater than the preset threshold, performing correction and expanding the image samples with the corrected at least some images in the to-be-expanded images, and returning to use the image samples to train the neural network; if the proportion is less than the preset threshold, ending the training, thereby obtaining the trained neural network.

13. The computer device according to claim 12, wherein the image set includes multiple groups of images, and images in each group include a same target; when obtaining definition labels of some images in the image set, the processor executes the program to implement: obtaining a definition label of one image with the highest definition in each group of images, thereby obtaining image samples with the definition labels.

14. The computer device according to claim 13, wherein when extracting definition features of at least some images in the image set, obtaining definition labels of at least some images in the to-be-expanded images according to the extracted definition features, correcting the definition labels of the at least some images in the to-be-expanded images to expand the image samples, and using the image samples to train the neural network of predicting image definition, thereby obtaining a trained neural network, the processor executes the program to implement:

extracting definition features of each image in the image set;

calculating similarity between the definition features of each image sample and the definition features of other images in the group to which the each image sample belongs;

obtaining definition labels of other images, which are used as to-be-expanded images, in each group, according to the similarity, and correcting the definition labels of the to-be-expanded images to expand the image samples;

using the expanded image samples to train the neural network of predicting image definition, thereby obtaining the trained neural network.

15. The computer device according to claim 14, wherein before extracting definition features of each image in the image set, the processor executes the program to implement: detecting target feature points of each image in the image set, and performing target alignment on each image in each group of images according to the target feature points.

16. The computer device according to claim 13, wherein when extracting definition features of at least some images in the image set, obtaining definition labels of at least some images in the to-be-expanded images according to the extracted definition features, correcting the definition labels of the at least some images in the to-be-expanded images to expand the image samples, and using the image samples to train the neural network of predicting image definition, thereby obtaining a trained neural network, the processor executes the program to implement:

extracting definition features of each image in the image set;

calculating similarity between the definition features of each image sample and the definition features of other images in the group to which the each image sample belongs;

obtaining definition labels of other images, which are used as to-be-expanded images, in each group, according to the similarity, and correcting the obtained definition labels of some images in the to-be-expanded images to expand the image samples;

using the expanded image samples to train the neural network;

using the trained neural network to extract definition features of some images in the to-be-expanded images and perform definition prediction on the some images in the to-be-expanded images, thereby obtaining definition labels of the some images in the to-be-expanded images;

determining whether a proportion of definition labels that need to be corrected, in the definition labels of the some images in the to-be-expanded images, is greater than a preset threshold, according to whether the definition labels of the some images in the to-be-expanded images, which are obtained based on definition prediction, are consistent with the definition labels of the some images in the to-be-expanded images, which are obtained based on similarity calculation; if the proportion is greater than the preset threshold, performing correction and expanding the image samples with the corrected some images in the to-be-expanded images, and using the expanded image samples to train the neural network; if the proportion is less than the preset threshold, ending the training, thereby obtaining the trained neural network.

17. A computer-readable storage medium, comprising a computer program stored thereon; wherein the computer program is executed by a processor to implement the method according to claim 1.

18. The method according to claim 1, wherein the preset threshold is 10%.

19. The method according to claim 1, wherein the definition labels include five definition levels.

* * * * *